June 27, 1933.  A. ALSAKER  1,915,640
PIN AND LOCKING WASHER
Filed Dec. 13, 1928
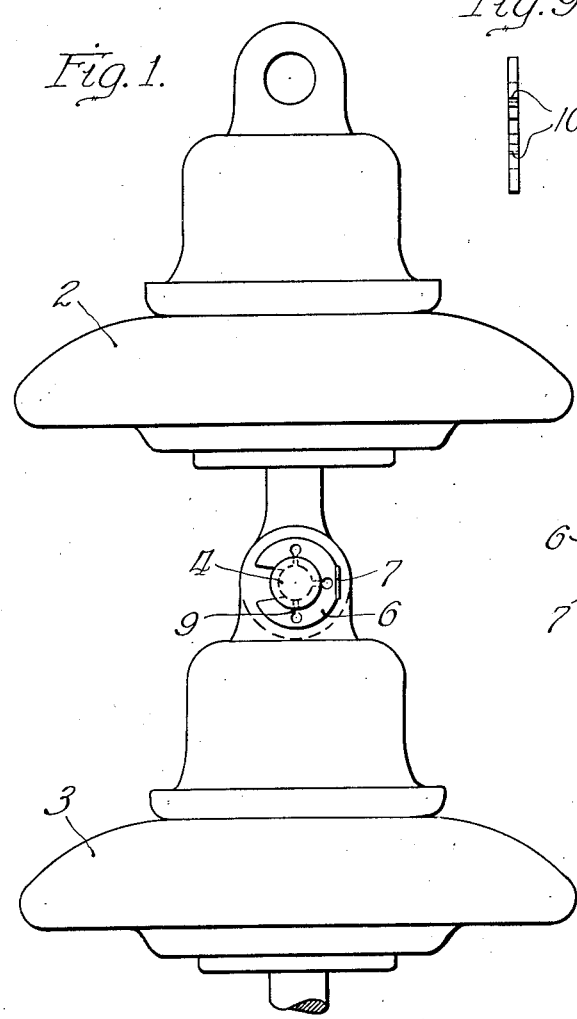
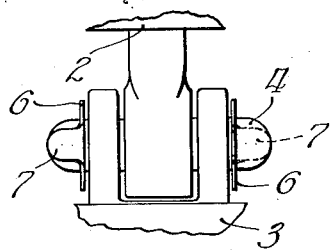
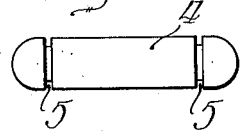
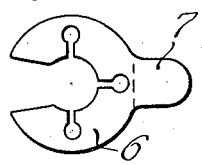
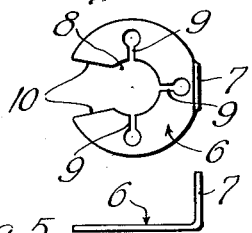
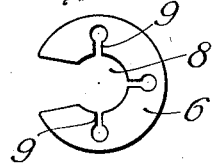
Inventor
Alfred Alsaker
By Brown Jackson Boettcher Dienner
Attys.

Patented June 27, 1933

1,915,640

UNITED STATES PATENT OFFICE

ALFRED ALSAKER, OF CHICAGO, ILLINOIS, ASSIGNOR TO THE DELTA-STAR ELECTRIC COMPANY, OF CHICAGO, ILLINOIS, A CORPORATION OF ILLINOIS

PIN AND LOCKING WASHER

Application filed December 13, 1928. Serial No. 325,752.

The subject matter of this invention is a new and improved pin and lock washer.

Heretofore, various kinds of devices have been used to lock a pin in position, but the matter of obtaining a more satisfactory locking device has been a problem before the minds of engineers and inventors for many years. The cotter pin has been universally used in the past, but it has certain inherent disadvantages. To remove a cotter pin, it must be pried out either with sheer force or the two prongs of the cotter pin must be carefully bent together before it is removed. The former operation may damage either the cotter pin or the pin to which it is fastened and is difficult without the aid of a special tool which will fit into the eye of the cotter pin. The latter operation is not always feasible, especially when close access thereto cannot be had. This is particularly true in fastenings on strain insulators on high tension transmission towers, after the high tension line is in service.

A relatively few bendings of the prongs of a cotter pin also weakens them. The cotter pin is, therefore, not suited for repeated use.

I have devised a new and improved fastening device, which comprises a lock washer and pin to be used therewith, that is simple in design, easily placed in position, and is also easily removed whenever it is necessary to do so without damage to either the washer or the pin. It may, therefore, be used repeatedly. The lock washer is especially designed so that it may be pulled free from the pin with a hot stick tool. For the latter reason, especially, it is well adapted for use in fastening strain insulators.

To acquaint those skilled in the art with the manner of constructing and using a device embodying the principles of my invention, I shall describe, in connection with the accompanying drawing, a specific embodiment of the same.

In the drawing:

Figure 1 is a front view of two insulators coupled together by means of my new pin and lock washer, the pin and lock washer being shown in end elevation;

Figure 2 is another view of the insulator joint, showing the pin and lock washer in side elevation;

Figure 3 is a view of the pin;

Figure 4 is a plan view of the washer;

Figure 5 is a side view of the washer;

Figure 6 is a plan view of the washer blank;

Figure 7 is a plan view of the modified form of washer; and

Figures 8 and 9 are plan and side views respectively of another modified form of washer.

The two tongue-and-groove type insulators 2 and 3 are coupled together by means of the pin 4 and the lock washer 6, the pin 4 passing through a perforation in the lower coupling lug of insulator 2 and aligned perforations in the two upper coupling lugs of insulator 3.

The pin 4 consists of a cylindrical rod and has a circumferential slot 5 a short distance from each end. The washer 6 consists of a flat punching of springy material having a substantially circular outside periphery with a lip projection 7 bent upward to an angle of approximately 90° with respect to the face of the washer. The thickness of the washer is substantially equal to the width of the slot 5. Opposite the lip 7, and extending into the center perforation 8 of the washer, a tapered slot is provided. The center perforation 8 is circular, of a diameter substantially equal to that of the pin 4 at the base of the slot 5. The sides 10 of the slot taper outwardly to facilitate the placing of the washer on the pin. At its narrowest point, at the point where it enters the circular perforation 8, the width of the slot is considerably less than the diameter of the pin 4 at the base of the slot 5, while at its outer margin, the width of the slot is equal to or slightly greater than, the diameter of the pin 4 at the base of the slot 5.

Three radial slots are provided, extending into the center perforation 8, for the purpose of adding flexibility to the washer.

To place the washer in position on the pin 4, it is slipped into the slot 5 with the two tapered edges 10 bearing on opposite sides of the reduced portion of the pin 4 in the slot 5.

Then, by pressing down on the lip 7, the washer is caused to spread until the slot in the washer is able to pass the reduced portion of the pin, whereupon the washer will spring back to its normal shape and into position, the pin centering itself in the circular perforation 8. The size of perforation 8 may be made such that the washer will be loose on the pin, or if it is equal to or even slightly smaller than the pin at the base of the slot, the pin will be firmly gripped by the washer when the washer is in position. The latter arrangement is preferred, since it eliminates wear on the pin and washer when they are in service.

Though the washer, when in position, will not come out under the most severe conditions of service, it may be removed with comparative ease with the aid of a pair of pliers by gripping the lip 7 and pulling outwards. This causes the washer to spring open and free itself from the pin. When used to couple insulators, as shown in Figures 1 and 2, in which case it might be impossible or dangerous to come within working distance with a pair of pliers, the washer may be removed with an ordinary hot stick, a long pole with a hook on one end. The distance between the lip 7 and the pin 4 is sufficient to accommodate the hook of a hot stick.

In the drawing, a pin with which two lock washers are to be used, one on each end, is shown. Obviously, a pin having a head on one end and a slot on the other for one lock washer could be used for the same purposes.

In Figure 7, I show a modified form of lock washer, which is similar to the lock washer illustrated in Figures 1 to 5, except that it has no lip 7. A washer of this design is cheaper to manufacture, and may be used in cases where the possibility of its having to be removed is small, or where close access to the same is easily had, in which case it may be removed with a pair of pliers by gripping the sides of the washer.

Figure 8 shows a modified form of washer. Instead of having radial slots such as 9 of the washer shown in Figure 7, this washer has a portion cut away at 12 opposite the sides 10. The sides 10 may be spread apart to permit the washer to be placed into or removed from a slot such as 5 in a pin such as 4, the portion 13 being sufficiently resilient for this purpose.

I also contemplate making the lock washer of rather ductile material, and making the circular perforation 8 somewhat larger than the pin 4 at the base of the slot 5, with the width of the slot at its narrowest point equal to the diameter of the pin 4 at the base of the slot 5. To place a washer of this kind in position, it is placed in the slot 5 until the central perforation 8 encircles the reduced portion of the pin 4 in the slot 5. Then, with the aid of a pair of pliers placed around the outer periphery, the edges of the washer are pressed together to bring the sides 10 of the slot in the washer somewhat closer together until the circular perforation 8 in the washer is reduced in size to the point where the washer firmly grips the reduced portion of the pin 4. The washer being made of more or less ductile material, this squeezing operation will give it a permanent set so that it will remain clamped around the pin.

I do not wish to be limited to the precise construction shown. Many other modifications will suggest themselves to those skilled in the art without departing from the scope of the invention.

I claim:

1. A sheet metal washer circular along its outer periphery and having a circular perforation in the center and a tapering radial slot extending from the outer periphery of the washer into said perforation, said slot being of greatest width at the outer periphery of the washer, the sides of the slot being parallel adjacent the outer ends thereof, said washer having an arcuate slot parallel to the outer periphery of the washer and located between the circular perforation and the outer periphery, on the side of the perforation opposite the tapering radial slot the washer being unbroken between the central perforation and its exterior except for the arcuate slot.

2. A sheet metal washer having a circular central perforation, a radial slot communicating with said perforation and the periphery of the washer, said slot being defined by convergent edges toward said central perforation and parallel edges at the periphery of the washer, a second radial slot communicating with said central perforation and being of a width substantially less than that of the narrowest portion of said first radial slot, and a second perforation communicating with said second radial slot and disposed in proximity to the periphery of the washer but terminating short of the outer edge defining a reduced portion of the washer between said second perforation and the outer edge, so that flexion of the washer produced by pressure exerted on the portions of the washer defined by said first named radial slot will occur at said reduced portion.

3. A sheet metal washer having a circular central perforation, a radial slot communicating with said perforation and the periphery of the washer, said slot being defined by convergent edges toward said central perforation and parallel edges at the periphery of the washer, said washer being circular along its outer periphery on the side opposite said slot, a second radial slot communicating with said central perforation and being of a width substantially narrower than that of the narrowest portion of said first radial slot, and an annular slot communicating with said second radial slot and disposed concentrically of the periphery of the washer and located on the side of said central perforation opposite said first radial slot, and defining a reduced portion of the washer with the periphery thereof, so that flexion of the washer produced by pressure exerted on the portions of the washer defined by said first named radial slot will occur at said reduced portion.

In witness whereof, I hereunto subscribe my name this 26th day of November, 1928.

ALFRED ALSAKER.